I. W. COLE.
TIRE.
APPLICATION FILED NOV. 27, 1915.
1,202,968.
Patented Oct. 31, 1916.
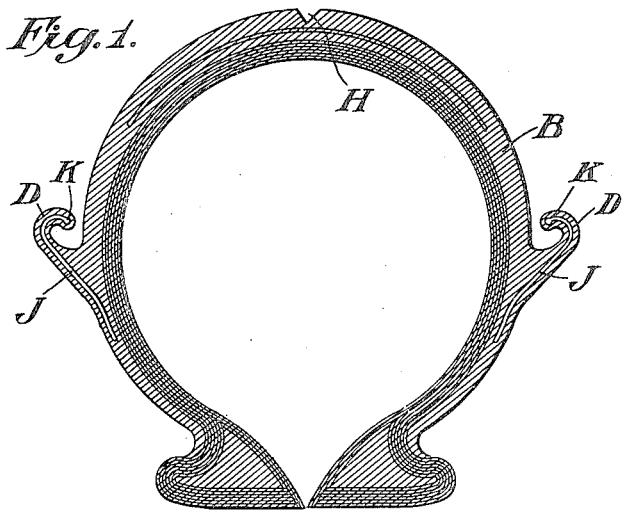
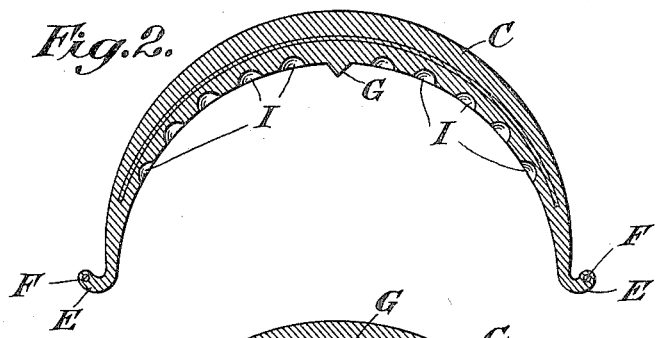
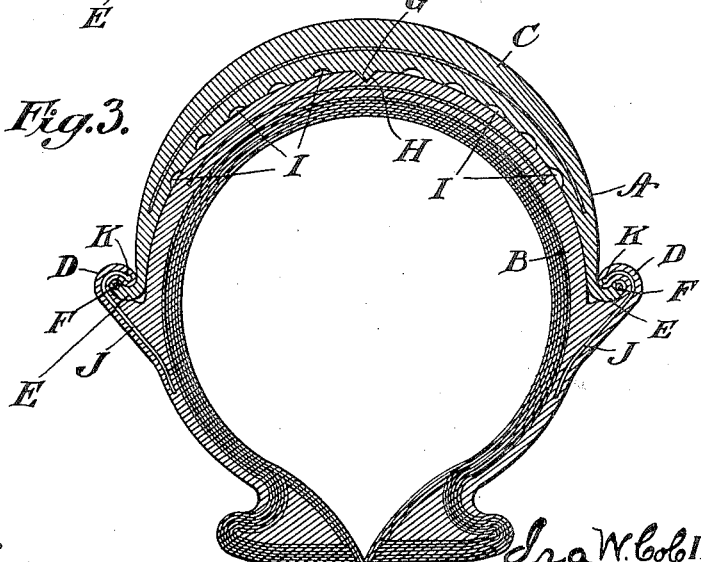
Ira W. Cole, Inventor:
by Andrew H. Scoble,
Atty.
Attest:

UNITED STATES PATENT OFFICE.

IRA W. COLE, OF PLAINFIELD, NEW JERSEY.

TIRE.

1,202,968.  Specification of Letters Patent.  Patented Oct. 31, 1916.

Application filed November 27, 1915. Serial No. 63,800.

*To all whom it may concern:*

Be it known that I, IRA W. COLE, a citizen of the United States, residing at 1314 South avenue, Plainfield, Union county, State of New Jersey, have invented new and useful Improvements in Tires, of which the following is a specification.

My invention relates to improvements in tires which are used on automobiles, motor vehicles of all kinds and other vehicles and the objects of my improvements are: First: to provide a tire the outer part or tread of which, when worn, cut or broken, can be detached and removed from the main tire or shoe and another similar part, tread or strip put thereon, in place thereof, so that the part or strip or tread of the tire or shoe which comes in contact with the ground or road and upon which the wear and tear of road contact and use falls, can be removed and detached while the main body of the tire or shoe can be continued in use for a much longer period than as at present. At the present time in such tires there is a great wear and tear upon the surface of the tire known as the tread, which comes in contact with the surface of the roadway or ground and which constitutes not more than thirty per cent. of a tire when properly inflated so that when this thirty per cent. of a tire is worn out seventy per cent. of a tire is still unworn and yet is useless.

The object of this invention is to provide means whereby this ordinarily unusable seventy per cent. of a tire may be used by replacing upon the used tread thereof another tread whereby the life of the tire will be greatly prolonged. I attain this object by the tire illustrated in the accompanying drawings, in which—

Figure 1 is a cross section view of the tire showing only the main body or shoe. Fig. 2, is a cross section view of the detachable strip or part of the tire. Fig. 3, is a cross section view of the entire tire.

Similar letters refer to similar parts throughout the several views.

My tire A, consists of the main shoe B, and the strip, C.

The shoe B is made in the usual manner of rubber and canvas or other material but, in my invention, this shoe has, at either side, an inverted flange D running around the entire circumference. These flanges are made of rubber and canvas and have inserted therein metal strips J which run from the edges of the inverted flanges as shown at K down through the flanges and into the main body of the shoe.

The strip C is made of rubber and canvas, or other material, having a rubber outer surface, a center of canvas and a rubber inner or under surface and having at either side or extreme a flange E through the edges of which passes a metal core or wire F throughout the entire circular length thereof. On the under side of this strip at the center thereof is a triangular annular ridge G, while in the main shoe, at the center of the outer surface of the shoe, there is a corresponding annular triangular depression H. The base or bottom of the strip C has, at intervals, shallow cups I.

The shoe B is placed upon the wheel in the usual manner, for my tire can be made to fit any sort or form of wheel and can be used with any inner tube as at present, and the shoe B is then brought to a low inflation; the strip C is placed upon the shoe B, so that the ridge G fits in the depression H and the flanges E and E are slipped into the inverted flanges D and D so that the edges of the flanges E and E will pass up and around the inner edge of the flanges D and D. The cups, I, will then be set upon and rest upon the outer surface of the shoe B. The inflation is then continued until the full inflation is reached when the flanges D and D and E and E will be locked and held firmly together this being accomplished by the metal core or wire F in the flanges E and E and the metal strips J in the flanges D and D being held together by the heavy pressure of the full inflation. The ridge G is inserted in the depression H and when the inflation is completed holds the strip C in place and prevents any side movement of the strip C.

The interlocking of flanges D D and E E on full inflation of the tire prevents any water, sand, gravel or other substance from entering between the strip C and the shoe B thus preventing any moisture rot or water rot of the shoe and preventing any frictional wear upon the shoe B or on the under side of the strip C; in addition this also holds the strip C, firmly in place and prevents any movement of the strip C.

When the strip C is worn down by use or rendered useless by cuts or tears it can be taken off by deflating the tire which unlocks the flanges D D of the shoe B, and the flanges E E of the strip C, and disengages the grip of the ridge G from the incision or groove H and a new strip can be placed thereon.

I claim:

A shoe for pneumatic tires provided on the outer faces of its opposite side walls midway the width of said side walls with integral flanges having their edges curled inwardly and spaced from the side walls of the shoe to form locking elements hook-shaped in cross section, reinforcing metal strips embedded in said flanges and extending throughout the width thereof and into the body of the shoe beyond the base of the flanges, an auxiliary tread strip for engaging the outer face of said shoe between the flanges thereof, the edges of said strip being outturned and curved to form attaching flanges hook-shaped in cross section for interlocking engagement with the flanges of the shoe, and reinforcing wires arranged in the flanges of said tread strip, whereby the flanges of the strip and shoe will be locked and firmly held in interlocking engagement on the full inflation of the tire.

IRA W. COLE.

Witnesses:
 CATHERINE M. LANKFORD,
 ALICE WILKINSON.